US006978817B2

(12) United States Patent
Ho et al.

(10) Patent No.: US 6,978,817 B2
(45) Date of Patent: Dec. 27, 2005

(54) METHOD FOR MANUFACTURING FLUOROPOLYMER COMPOUND PLATE AND DEVICE FOR MANUFACTURING THE SAME

(75) Inventors: Amber Ho, Taipei (TW); Roger Chang, Taipei (TW)

(73) Assignee: Allied Supreme Corp, Taipei (TW)

( * ) Notice: Subject to any disclaimer, the term of this patent is extended or adjusted under 35 U.S.C. 154(b) by 278 days.

(21) Appl. No.: 10/371,424

(22) Filed: Feb. 17, 2003

(65) Prior Publication Data

US 2003/0168759 A1 Sep. 11, 2003

(51) Int. Cl.$^7$ .............................................. B32B 31/04
(52) U.S. Cl. ...................... 156/555; 156/499; 156/543; 425/335
(58) Field of Search ............................... 156/543, 555, 156/559, 560, 499; 425/335

(56) References Cited

U.S. PATENT DOCUMENTS 4,444,709 A * 4/1984 Hayashi et al. ........ 264/171.21

5,944,937 A * 8/1999 Fukumoto ................ 156/309.6

* cited by examiner

*Primary Examiner*—Jeff H. Aftergut
*Assistant Examiner*—John L. Goff

(57) ABSTRACT

A method for manufacturing a fluoropolymer compound plate comprises the steps of: combining a fluoropolymer sheet and a medium plate as a fluoropolymer compound plate; transferring the fluoropolymer compound plate to a preheat section for being heated uniformly in a lower tension, transferring the fluoropolymer compound plate to a melting section for heating the fluoropolymer sheet of the fluoropolymer compound plate; transferring the fluoropolymer compound plate to a pressing section by rollers; and compressing and annealing the fluoropolymer compound plate. A device for performing the method comprises a plurality of tension adjusting axial seats; a plurality of roller; a pair of first guide wheels; an upper and a lower layer radiating heater; a third guide wheel set; an upper and a lower layer high temperature radiating heater; a guiding roller; a shaping heater; a plurality of temperature controller roller sets and a product winding wheel.

3 Claims, 1 Drawing Sheet

METHOD FOR MANUFACTURING FLUOROPOLYMER COMPOUND PLATE AND DEVICE FOR MANUFACTURING THE SAME

FIELD OF THE INVENTION

The present invention relates to fluoropolymer compound plates, and particularly to a method for manufacturing a fluoropolymer compound plate and a device for manufacturing the same.

BACKGROUND OF THE INVENTION

Fluoropolymer is a superior heat and chemical-tolerant and high-purity material so that it is suitable to be used in manufacturing, storing and transferring high purity chemicals. For example, semi-conductor industry uses high purity chemicals and very cleaned containers, and thus fluoropolymer is useful in this industry.

General used fluoropolymer materials include polytetrafluoroethylene (PTFE), copolymer of polytetrafluoroethylene and perfluoropropylvinyl ether(PFA); copolymer of polytetrafluoroethylene and hexfluoropropolene (FEP); copolymer of tetrafluoroethylen and ethylene(ETFE); polytrifloruchloroethylene (PCTFE); copolymer of trifluorochlorothylene and ethylene (ECTFE); polymetadifluoroethylene (PVDF), etc. for storing chemical products so as to maintain the purity of wear-tolerant chemicals. Unluckily, the fluoropolymer compound plates have a lower surface tension and thus it is an anti-adhesive material so that it is difficult to stick the fluoropolymer sheet to other object.

SUMMARY OF THE INVENTION

Accordingly, the primary object of the present invention is to provide a method for manufacturing a fluoropolymer compound plate comprising the steps of: combining a fluoropolymer sheet and a medium plate as a fluoropolymer compound plate; transferring the fluoropolymer compound plate to a preheat section for being heated uniformly in a lower tension, transferring the fluoropolymer compound plate to a melting section for heating the fluoropolymer sheet of the fluoropolymer compound plate in a lower tension condition; transferring the fluoropolymer compound plate to a pressing section by rollers; and compressing and annealing the fluoropolymer compound plate by temperature controller roller sets and controlling crystal property of the fluoropolymer compound plate and removing stresses in the fluoropolymer compound plate.

Another object of the present invention is to provide a device for manufacturing a fluoropolymer compound plate which comprises a plurality of tension adjusting axial seats; a plurality of roller; a pair of first guide wheels; an upper layer radiating heater and a lower layer radiating heater; a third guide wheel set; an upper layer high temperature radiating heater and a lower layer high temperature radiating heater; a guiding roller; a shaping heater; a plurality of temperature controller roller sets and a product winding wheel.

The various objects and advantages of the present invention will be more readily understood from the following detailed description when read in conjunction with the appended drawing.

DETAILED DESCRIPTION OF THE PREFERRED EMBODIMENTS

Figure 1:
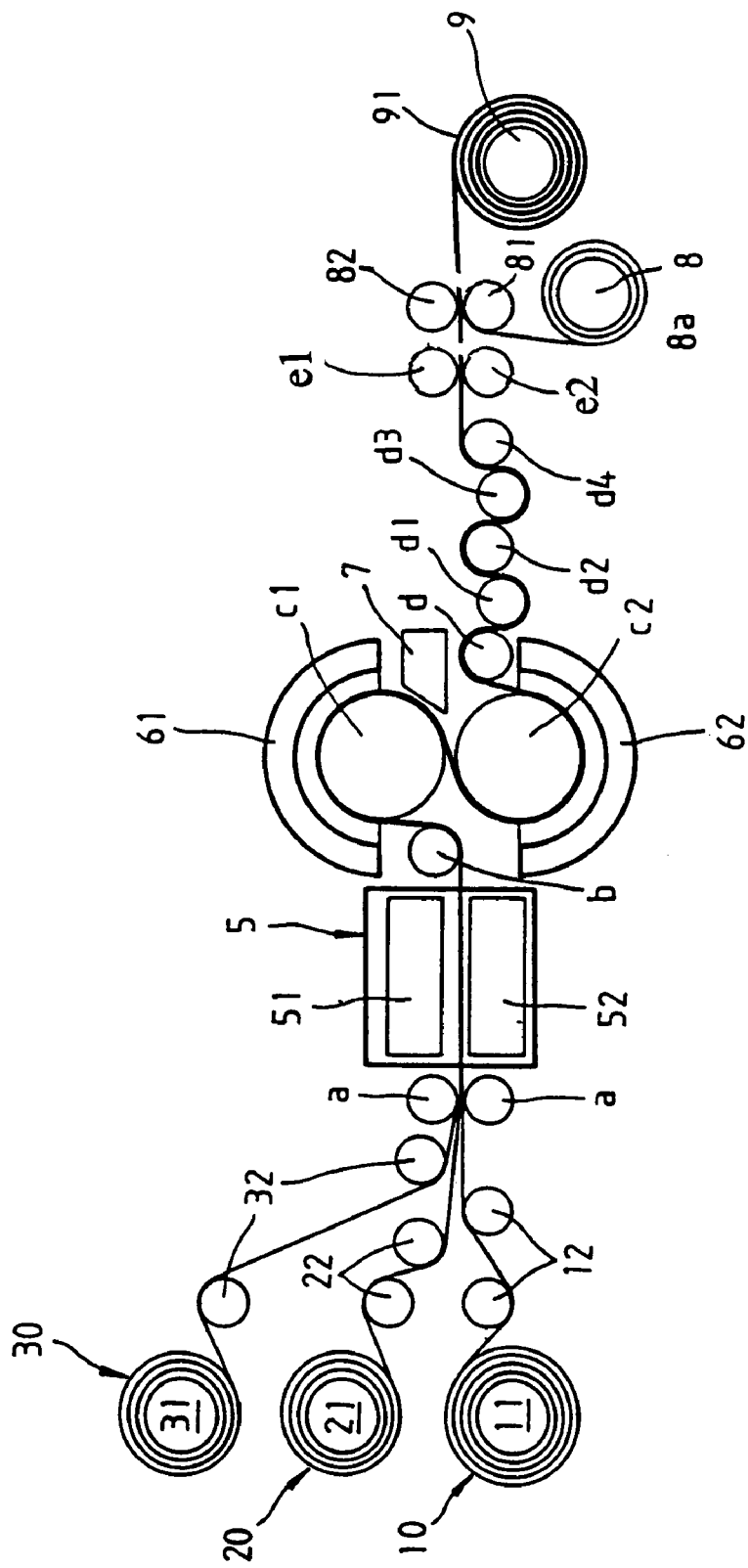
FIG. 1 is a schematic view showing the device for manufacturing a fluoropolymer compound plate according to the present invention.

Referring to FIG. 1, the device for manufacturing the fluoropolymer compound plate of the present invention is illustrated. The device comprises the following components.

A first tension adjusting axial seat 11 wound with a fluoropolymer sheet.

A second tension adjusting axial seat 21 wound with a fluoropolymer film.

A third tension adjusting axial seat 31 wound with a glass fiber cloth.

A roller 12 for guiding the fluoropolymer sheet from the first tension adjusting axial seat 11.

A roller 22 for guiding the fluoropolymer film from the second tension adjusting axial seat 21.

A roller 32 for guiding the glass fiber cloth from the tension adjusting axial seat 31.

A pair of first guide wheels a for guiding and combining the fluoropolymer sheet, fluoropolymer film and fluoropolymer compound plate of the rollers 21, 22, 32 so as to form a fluoropolymer compound plate.

An upper layer radiating heater 51 and a lower layer radiating heater 52 installed after the first guide wheel set a. The fluoropolymer compound plate passes through the upper layer radiating heater 51 and lower layer radiating heater 52 so as to be heated by the upper layer radiating heater 51 and lower layer radiating heater 52.

A second guide wheel b which further guides the fluoropolymer compound plate from the guide wheels a.

A third guide wheel set c has an upper roller c1 and a lower wheel c2. The fluoropolymer compound plate winds through the upper roller c1 and lower roller c2.

An upper layer high temperature radiating heater 61 enclosing the upper roller c1 and a lower layer high temperature radiating heater 62 enclosing the lower roller c2 are installed after the guide wheel b for further heating fluoropolymer compound plate.

A roller d for guiding the fluoropolymer compound plate out of the third guide wheel c.

The shaping heater 7 is installed aside the roller d.

A plurality of temperature controller roller sets d1, d2, d3, and d4 for driving the fluoropolymer compound plate and adjusting the temperature of the fluoropolymer compound plate.

A current draining detecting roller set e1, and e2 for detecting electric property of the fluoropolymer compound plate so as to determining the holes on the fluoropolymer compound plate.

A fourth tension adjusting axial seat 8 wound with PVC film and driving roller sets 81 and 82. The fluoropolymer compound plate out of the current draining detecting roller set passes through the driving roller sets 81 and 82 so as to be adhered with the PVC film.

A product winding wheel 9 for winding the fluoropolymer compound plate 91 adhered with the PVC film.

The present invention further comprises the method for manufacturing the fluoropolymer compound plate of the present invention is illustrated, which comprising the following steps:

Winding a fluoropolymer sheet 10 on a first tension adjusting axial seat 11, a fluoropolymer film 20 (PFA film or FEP film or PTFE film) on a second tension adjusting axial seat 21 and a glass fiber cloth on a tension adjusting axial seat 31.

Guiding the fluoropolymer sheet 10, fluoropolymer film 20 and glass fiber cloth 30 with respective rollers and then combining the fluoropolymer sheet 10, fluoropolymer film 20 and glass fiber cloth 30 as a fluoropolymer compound plate, wherein the fluoropolymer sheet 10 is placed as a lower layer, the fluoropolymer film 20 is placed as a middle layer and the glass fiber cloth 30 is placed as an upper layer.

Transferring the fluoropolymer compound plate to a preheat section for being heated, wherein the preheat section includes a preheat furnace 5 which is formed by an upper layer radiating heater 51 and a lower layer radiating heater 52. The temperature setting of the preheat furnace is based on the thickness of the fluoropolymer compound plate and the speed of manufacturing. Moreover, after the fluoropolymer compound plate passes through the preheat section, the temperature of the fluoropolymer compound plate must be below the melting point of the fluoropolymer compound plate.

Transferring the fluoropolymer compound plate to a melting section which is formed by an upper layer high temperature radiating heater 61 and a lower layer high temperature radiating heater 62, wherein the fluoropolymer compound plate is wound around the upper layer high temperature radiating heater 61 and lower layer high temperature radiating heater 62 so that the outer side of the fluoropolymer compound plate 10 is radiated so as to have a temperature higher than the melting point thereof. Referring to FIG. 1, the temperature of the upper roller c1 must be lower than the melting point of the fluoropolymer. After the fluoropolymer compound plate leaves the upper layer high temperature radiating heater 61 and before the fluoropolymer compound plate enters into the lower roller c2, the heater 7 can heat the surface of the glass fiber cloth 30 so that the temperature of the glass fiber cloth 30 is identical to that of the fluoropolymer sheet 10. Moreover, the lower roller c2 is also heated to a temperature identical to the melting point of the fluoropolymer so that the fluoropolymer compound plate 10, can be melt and then combined to the glass fiber cloth 30. The gap between the upper roller c1 and lower roller c2 is according to the thickness of the final fluoropolymer compound plate so as to have an optimum melting connection.

Transferring the fluoropolymer compound plate to a pressing section by roller d.

Compressing and annealing the fluoropolymer compound plate by temperature controller roller sets d1, d2, d3 and d4 and controlling crystal property of the fluoropolymer compound plate.

Detecting holes on the fluoropolymer compound plate by transferring the fluoropolymer compound plate to a quality control section formed by current draining detecting roller set e1, and e2.

Transferring the fluoropolymer compound plate out of the current draining detecting roller set through the driving roller sets 81 and 82 so as to be adhered with the PVC film, wherein a fourth tension adjusting axial seat 8 wound with PVC film and driving roller sets 81 and 82.

Winding the fluoropolymer compound plate adhered with the PVC film by a product winding wheel.

One embodiment for manufacturing a 2.5 mm PTFE fluoropolymer compound plate of the present invention will be described here. The parameters is set as the following data.

Thickness of PTFE plate 10: 2 mm
Thickness of PFA film 20: 0.127 mm
Thickness of the glass fiber cloth: 0.5 mm
Tension of the tension adjusting axial seats 11, 21 and 31: 150 Kg
Temperature setting of the upper layer radiating heater 51: 300° C.
Thickness of the lower layer radiating heater 52: 250° C.
Temperature setting of the upper layer high temperature radiating heater 61: 400° C.
Temperature setting of the lower layer high temperature radiating heater 62: 360° C.
Thickness setting of the upper roller c1; 300° C.
Thickness setting of the lower roller c2: 330° C.
The gap between the upper roller c1 and lower roller c2: 2.5 mm
Temperature setting of the heater 7: 400° C.
Temperature setting of the temperature controller roller set d: 330° C.
Temperature setting of the temperature controller roller set d1: 300° C.
Temperature setting of the temperature controller roller set d2: 250° C.
Temperature setting of the temperature controller roller set d3: 80° C.
Temperature setting of the temperature controller roller set d3: 20° C.
The voltage setting of high current draining detecting roller set e1, and e2: 20000V DC.
Thickness of the PVC film 8a: 0.3 mm.
Manufacturing transfer speed: 5M/Hr Based on above manufacturing process, a 2.5 mm PTFE fluoropolymer compound plate with a specific weight of 2.182 is acquired. The fastening strength between the PTFE plate and the glass fiber cloth is 21.9 N/cm.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A device for manufacturing a fluoropolymer compound plate comprising:

a first tension adjusting axial seat wound with a fluoropolymer sheet; a second tension adjusting axial seat wound with a fluoropolymer film and a third tension adjusting axial seat wound with a glass fiber cloth;

a first roller for guiding the fluoropolymer sheet from the first tension adjusting axial seat; a second roller for guiding the fluoropolymer film from the second tension adjusting axial seat; and a third roller for guiding the glass fiber cloth from the tension adjusting axial seat;

a pair of first guide wheels for guiding and combining the fluoropolymer sheet, fluoropolymer film and fluoropolymer compound plate on the rollers so as to form a fluoropolymer compound plate;

an upper layer radiating heater and a lower layer radiating heater installed after the first guide wheel set; wherein the fluoropolymer compound plate passes through the upper layer radiating heater and lower layer radiating heater so as to be heated by the upper layer radiating heater and lower layer radiating heater;

a second guide wheel which further guides the fluoropolymer compound plate from the first guide wheels;

a third guide wheel set including an upper roller and a lower roller; the fluoropolymer compound plate winding through the upper roller and lower roller;

an upper layer high temperature radiating heater enclosing the upper roller and a lower layer high temperature radiating heater enclosing the lower roller being installed after the second guide wheel for further heating the fluoropolymer compound plate;

a guiding roller for guiding the fluoropolymer compound plate out of the third guide wheel;

a shaping heater for heating and thus shaping the fluoropolymer compound plate from the guiding roller;

a plurality of temperature controller roller sets for driving the fluoropolymer compound plate and adjusting the temperature of the fluoropolymer compound plate; and a product winding wheel for winding the fluoropolymer compound plate to be adhered with a PVC film.

2. The device for manufacturing a fluoropolymer compound plate as claimed in claim 1, wherein a current draining detecting roller for detecting holes on the fluoropolymer compound plate is installed at the temperature controller roller set.

3. The device for manufacturing a fluoropolymer compound plate as claimed in claim 1, wherein a fourth tension adjusting axial seat wound with PVC film and a plurality of driving roller sets are installed between the temperature controller roller set and the product winding wheel; thereby, the fluoropolymer compound plate out of a current draining detecting roller set passes through the driving roller sets so as to be adhered with the PVC film.

\* \* \* \* \*